INVENTORS
HENRY BUCHEISTER
RALPH ABRAMS
BY
ATTORNEY

United States Patent Office

3,268,748
Patented August 23, 1966

3,268,748
REVERSIBLE MOTOR DRIVE MECHANISM
Henry Bucheister, Providence, and Ralph Abrams, Warwick, R.I., assignors to Cable Electric Products, Inc., Providence, R.I., a corporation of Rhode Island
Filed Apr. 9, 1964, Ser. No. 358,553
15 Claims. (Cl. 310—41)

Our present invention relates to reversible motors, and more particularly to a mechanism for activating the reversing effect of the motor.

The principal object of the present invention is to provide a device for automatically stopping a reversible motor and causing it to reverse direction at any given point in the circumference of operation.

Another object of the present invention is to provide a simple device for causing the reversing of a reversible motor and which is operated by the motor mechanism itself.

A further object of the present invention is to provide a device for reversing a reversible motor which takes the strain off the motor drive mechanism.

Another object of the present invention is to provide a device for reversing a reversible motor which can be set for any degree of drive.

A further object of the present invention is to provide a device for reversing a reversible motor which is simple in construction and easy and economical to manufacture and assemble.

With the above and other objects and advantageous features in view our invention consists of a novel arrangement of parts more fully disclosed in the detailed description following, in conjunction with the accompanying drawings and more particularly defined in the appended claims.

Reversible motors are conventionally designed to reverse their movement when motion in one direction is brought to a standstill by some sort of stop mechanism. In such case the motor will reverse itself and begin turning in the opposite direction. Such motors are often used in advertising devices. Normally such motors operate at fairly high r.p.m. with not much power. However, gear trains are provided to reduce the speed and increase the power so that the advertising device, insignia or other article will rotate or oscillate at a slower speed. A stop mechanism must be provided so that at the end of its movement in one direction the motor is reversed and then it will move in the opposite direction. However, when such stop mechanisms are provided, a great strain is placed on the gear train. Jamming of the gear train and binding of the parts often results. The present invention is to provide a stop mechanism for reversing a reversible motor which is operable at the output end but which actually acts to stop the motor itself and bypasses the gear train so as to remove the strain and cause the reversing action at the point of least power.

Figure 1:
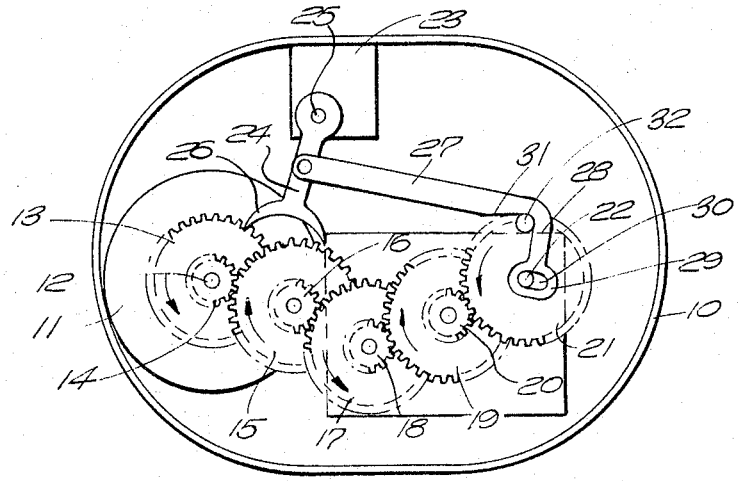
FIG. 1 is a plan view of a reversible motor and drive mechanism equipped with the reversing device of the present invention.

FIG. 1 illustrates the device mounted in a housing 10 having a conventional reversible motor 11 with a drive shaft 12. Mounted on the drive shaft 12 is a comparatively large gear 13 and a smaller gear 14. Mounted adjacent the reversible motor 11 is a gear train which may be of any desired length to provide any desired speed of operation. For example, a comparatively large gear 15 is rotatably mounted to mesh with the smaller gear 14 on the drive shaft 12, and is in turn provided with its own small gear 16 which meshes with another large gear 17. The large gear 17 is also provided with its own small gear 18 which meshes with another large gear 19 having a small gear 20 which meshes with a large gear 21. The large gear 21 rotates the output shaft 22 which drives the advertising, insignia or any other device.

In normal operation the reversible motor 11 will be rotating at a comparatively large rate of speed. By the use of the gear train and the constant reductions from large to small gears, the output shaft 22 may be rotating at no more than four revolutions per minute. It may be desirable to reverse the advertising, insignia or device at the end of each revolution or even part of a revolution. However, at some desirable point a stop member must be provided to stop the gear train and motor 11 and force the motor to reverse itself. Applicant accomplishes this by the mechanism illustrated in FIGS. 1 and 2.

Mounted in the housing 10 is a block 23. A lever arm 24 is pivotally mounted on the block 23 at 25 and its free end is provided with an integral arcuate portion 26 which is designed to act as an escape mechanism for the gear 13 mounted on the drive shaft 12 of the motor 11. Thus when the lever arm 24 is in the position shown in FIG. 1 it will hold the gear 13 against clockwise rotation but will permit counterclockwise rotation as shown by the arrow, and in the position shown in FIG. 2 it will permit clockwise rotation as shown by the arrow but will not permit counterclockwise rotation. The escape lever arm 24 is operated by a elongated lever bar 27 having one end pivotally attached to the central portion of the arm 24 as shown in FIG. 1. The other end of the bar 27 is turned sharply downwardly at right angles at 28 and terminates in an oval portion 29 having a slot 30 extending at right angles to the portion 28 in a T-shape. The portion 29 surrounds the output shaft 22 which extends through the slot 30. The inner portion of the bend between the portions 27 and 28 of the lever is cut away at 31. The output gear 21 which drives the output shaft 22 is provided with a stop pin 32.

Figure 2:
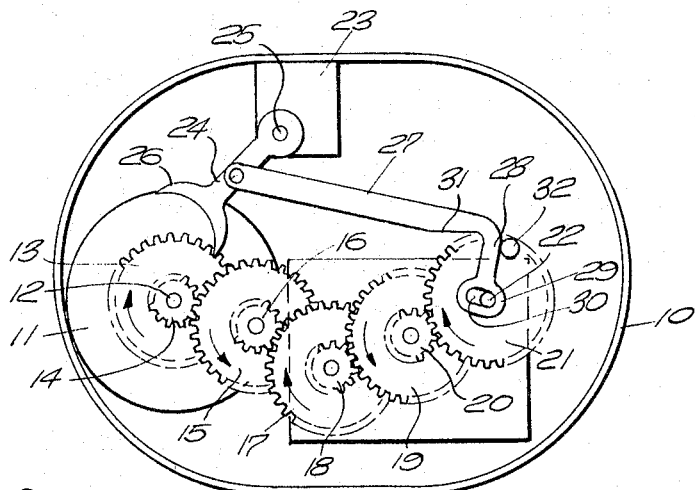
FIG. 2 is a view similar to FIG. 1 with the reversing device at the end of its stroke and about to reverse the motor.
Figure 3:
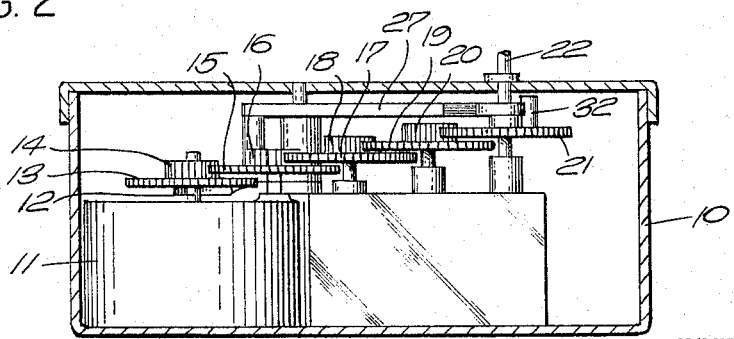
FIG. 3 is a bottom plan view of the mechanism.

Operation of the device is now apparent. When the motor is turned on as in FIG. 1 it will rotate in the direction of the arrow on the gear 13 which in this case is counterclockwise. Through the gear train the last gear 21 will also be driven counterclockwise as indicated by the arrow. The pin 32 will ride around with the gear 21 until it reaches the position shown in FIG. 2. At this point it will bear against the outer portion of the lever arm portion 28 and push the lever arm towards the left. This movement is permitted by the fact that the free end of the member 27 is slotted and the slot slides along the output shaft 22. This movement towards the left causes the escape mechanism bar 24 to pivot towards the left into the position shown in FIG. 2 engaging the teeth of the gear 13 and stopping the reversible motor 11. The motor now reverses its direction into the direction of the arrow shown in FIG. 2. The output gear 21 carrying the pin 32 now rotates clockwise until the pin reaches the position shown in FIG. 1. At this point the lever arm 27 with its portion 28 is swung towards the right and this movement causes the escape mechanism to pivot from the position shown in FIG. 2 to the position shown in FIG. 1 again stopping the motor 11 and causing it to reverse direction to repeat the entire operation again. Thus each time the pivot pin 32 engages the arm 28 either from the inner side of the bend or the outer side of the bend as shown in FIGS. 1 and 2, it will cause movement of the arm and in turn will cause the escape bar 24 to stop the motor and cause it to reverse. Thus not only is the gear train provided with a stop pin 32 which will cause it to come to a halt, but the strain is taken off the gear train by the escape member 24 which grasps the gear 13 mounted on the armature or drive shaft of the motor itself. It is at this point that the power of the motor is weakest. Thus the motor is caused to reverse with a minimum of strain on the gear train. Note however, that regardless of the effect of the escape arm 24, the pin 32 always provides a positive stop.

In the illustrated form, the output gear 21 is provided with a single pin 32 causing a reversal of the motor at the end of each 330 degrees or more of turning movement. The amount of degrees below the 360 level is caused by the thickness of the lever arm 28. However, the gear 21 may be provided with two or more pins. In which case the motor will be caused to reverse less than a full turning movement. For example, a half revolution or even a quarter of a revolution depending on the degree of oscillation required of the device.

It is therefore obvious that the device is very simple to manufacture and assemble. It will materially increase the life of the reversible motor and of the gear train. If desired the output gear 21 may be provided with a circumferential row of openings in which the pivot pin 32 may be inserted for different revolutions of rotation. Other advantages of the present invention will be readily apparent to a person skilled in the art.

We claim:

1. A reversible motor mechanism comprising a housing, a reversible motor having an armature shaft mounted in said housing, a gear mounted on said armature shaft, an output shaft extending from said housing, a gear in said housing on said output shaft, a reducing gear train in said housing connecting said armature shaft gear and said output shaft gear, and means in said housing for alternately reversing the rotation of said armature shaft gear to cause a reversal of rotation of said reversible motor.

2. A reversible motor mechanism comprising a housing, a reversible motor having an armature shaft mounted in said housing, a gear mounted on said armature shaft, an output shaft extending from said housing, a gear in said housing on said output shaft, a reducing gear train in said housing connecting said armature shaft gear and said output shaft gear, and means in said housing for alternately reversing the rotation of said armature shaft gear and said output shaft gear to cause a reversal of rotation of said reversible motor.

3. A reversible motor mechanism comprising a housing, a reversible motor having an armature shaft mounted in said housing, a gear mounted on said armature shaft, an output shaft extending from said housing, a gear in said housing on said output shaft, a reducing gear train in said housing connecting said armature shaft gear and said output shaft gear, and means in said housing for alternately reversing the rotation of said armature shaft gear and said output shaft gear simultaneously to cause a reversal of rotation of said reversible motor.

4. A reversible motor mechanism comprising a housing, a reversible motor having an armature shaft mounted in said housing, a gear mounted on said armature shaft, an output shaft extending from said housing, a gear in said housing on said output shaft, a reducing gear train in said housing connecting said armature shaft gear and said output shaft gear, and means in said housing for alternately reversing the rotation of said armature shaft gear to cause a reversal of rotation of said reversible motor, after a predetermined degree of rotation of said output shaft gear.

5. A reversible motor mechanism comprising a housing, a reversible motor having an armature shaft mounted in said housing, a gear mounted on said armature shaft, an output shaft extending from said housing, a gear in said housing on said output shaft, a reducing gear train in said housing connecting said armature shaft gear and said output shaft gear, and means in said housing for alternately reversing the rotation of said armature shaft gear and said output shaft gear simultaneously to cause a reversal of rotation of said reversible motor, after a predetermined degree of rotation of said output shaft gear.

6. A reversible motor mechanism comprising a housing, a reversible motor having an armature shaft mounted in said housing, a gear mounted on said armature shaft, an output shaft extending from said housing, a gear in said housing on said output shaft, a reducing gear train in said housing connecting said armature shaft gear and said output shaft gear, and means in said housing for alternately reversing the rotation of said armature shaft gear to cause a reversal of rotation of said reversible motor, said means including a lever arm pivotally mounted at one end, the free end of said lever arm forming an escape mechanism for intermittently engaging said armature shaft gear to stop the rotation of said motor.

7. A reversible motor mecahnism comprising a housing, a reversible motor having an armature shaft mounted in said housing, a gear mounted on said armature shaft, an output shaft extending from said housing, a gear in said housing on said output shaft, a reducing gear train in said housing connecting said armature shaft gear and said output shaft gear, and means in said housing for alternately reversing the rotation of said armature shaft gear to cause a reversal of rotation of said reversible motor, after a predetermined degree of rotation of said output shaft gear, said means including a lever arm pivotally mounted at one end, the free end of said lever arm forming an escape mechanism for intermittently engaging said armature shaft gear to stop the rotation of said motor.

8. A reversible motor mechanism comprising a housing, a reversible motor having an armature shaft mounted in said housing, a gear mounted on said armature shaft, an output shaft extending from said housing, a gear in said housing on said output shaft, a reducing gear train in said housing connecting said armature shaft gear and said output shaft gear, and means in said housing for alternately reversing the rotation of said armature shaft gear and said output shaft gear simultaneously to cause a reversal of rotation of said reversible motor, after a predetermined degree of rotation of said output shaft gear, said means including a lever arm pivotally mounted at one end, the free end of said lever arm forming an escape mechanism for intermittently engaging said armature shaft gear to stop the rotation of said motor.

9. A reversible motor mechanism comprising a housing, a reversible motor having an armature shaft mounted in said housing, a gear mounted on said armature shaft, an output shaft extending from said housing, a gear in said housing on said output shaft, a reducing gear train in said housing connecting said armature shaft gear and said output shaft gear, and means in said housing for alternately reversing the rotation of said armature shaft gear to cause a reversal of rotation of said reversible motor, said means including a lever arm pivotally mounted at one end, the free end of said lever arm forming an escape mechanism for intermittently engaging said armature shaft gear to stop the rotation of said motor, said lever arm being intermittently pivoted by means associated with said output shaft gear.

10. A reversible motor mechanism comprising a housing, a reversible motor having an armature shaft mounted in said housing, a gear mounted on said armature shaft, an output shaft extending from said housing, a gear in said housing on said output shaft, a reducing gear train in said housing connecting said armature shaft gear and said output shaft gear, and means in said housing for alternately reversing the rotation of said armature shaft gear to cause a reversal of rotation of said reversible motor, said means including a lever arm pivotally mounted at one end, the free end of said lever arm forming an escape mechanism for intermittently engaging said armature shaft gear to stop the rotation of said motor, a bar pivotally attached to said lever arm, the free end of said bar being bent at right angles downwardly and terminating in a horizontal slot portion mounted on said output shaft, and a stop pin on said output shaft gear adapted to engage said L-shaped bar portion in either direction of rotation.

11. A reversible motor mechanism comprising a housing, a reversible motor having an armature shaft mounted in said housing, a gear mounted on said armature shaft, an output shaft extending from said housing, a gear in said housing on said output shaft, a reducing gear train in said housing connecting said armature shaft gear and said output shaft gear, and means in said housing for alternately reversing the rotation of said armature shaft gear to cause a reversal of rotation of said reversible motor, after a predetermined degree of rotation of said output shaft gear, said means including a lever arm pivotally mounted at one end, the free end of said lever arm forming an escape mechanism for intermittently engaging said armature shaft gear to stop the rotation of said motor, said lever arm being intermittently pivoted by means associated with said output shaft gear.

12. A reversible motor mechanism comprising a housing, a reversible motor having an armature shaft mounted in said housing, a gear mounted on said armature shaft, an output shaft extending from said housing, a gear in said housing on said output shaft, a reducing gear train in said housing connecting said armature shaft gear and said output shaft gear, and means in said housing for alternately reversing the rotation of said armature shaft gear and said output shaft gear simultaneously to cause a reversal of rotation of said reversible motor, after a predetermined degree of rotation of said output shaft gear, said means including a lever arm pivotally mounted at one end, the free end of said lever arm forming an escape mechanism for intermittently engaging said armature shaft gear to stop the rotation of said motor, said lever arm being intermittently pivoted by means associated with said output shaft gear.

13. A reversible motor mechanism comprising a housing, a reversible motor having an armature shaft mounted in said housing, a gear mounted on said armature shaft, an output shaft extending from said housing, a gear in said housing on said output shaft, a reducing gear train in said housing connecting said armature shaft gear and said output shaft gear, and means in said housing for alternately reversing the rotation of said armature shaft gear to cause a reversal of rotation of said reversible motor, after a predetermined degree of rotation of said output shaft gear, said means including a lever arm pivotally mounted at one end, the free end of said lever arm forming an escape mechanism for intermittently engaging said armature shaft gear to stop the rotation of said motor, a bar pivotally attached to said lever arm, the free end of said bar being bent at right angles downwardly and terminating in a horizontal slot portion mounted on said output shaft, and a stop pin on said output shaft gear adapted to engage said L-shaped bar portion in either direction of rotation.

14. A reversible motor mechanism comprising a housing, a reversible motor having an armature shaft mounted in said housing, a gear mounted on said armature shaft, an output shaft extending from said housing, a gear in said housing on said output shaft, a reducing gear train in said housing connecting said armature shaft gear and said output shaft gear, and means in said housing for alternately reversing the rotation of said armature shaft gear and said output shaft gear simultaneously to cause a reversal of rotation of said reversible motor, after a predetermined degree of rotation of said output shaft gear, said means including a lever arm pivotally mounted at one end, the free end of said lever arm forming an escape mechanism for intermittently engaging said armature shaft gear to stop the rotation of said motor, a bar pivotally attached to said lever arm, the free end of said bar being bent at right angles downwardly and terminating in a horizontal slot portion mounted on said output shaft, and a stop pin on said output shaft gear adapted to engage said L-shaped bar portion in either direction of rotation.

15. A reversible motor mechanism comprising a housing, a reversible motor having an armature shaft mounted in said housing, a gear mounted on said armature shaft, an output shaft exetending from said housing, a gear in said housing on said output shaft, a reducing gear train in said housing connecting said armature shaft gear and said output shaft gear, and means in said housing for alternately reversing the rotation of said armature shaft gear to cause a reversal of rotation of said reversible motor, said means including a lever arm pivotally mounted at one end, the free end of said lever arm forming an escape mechanism for intermittently engaging said armature shaft gear to stop the rotation of said motor, a bar pivotally attached to said lever arm, the free end of said bar being bent at right angles downwardly and terminating in a horizontal slot portion mounted on said output shaft, and a stop pin on said output shaft gear adapted to engage said L-shaped bar portion in either direction or rotation, said pin engaging said bar to stop said output shaft and said lever arm engaging said armature gear to stop said motor.

References Cited by the Examiner
UNITED STATES PATENTS
2,874,809   2/1959   Poole _____ 310—41 X MILTON O. HIRSHFIELD, *Primary Examiner.*
J. W. GIBBS, *Assistant Examiner.*